(12) United States Patent
Jiang

(10) Patent No.: US 7,082,221 B1
(45) Date of Patent: Jul. 25, 2006

(54) BANDWIDTH DETERMINATION FOR MULTIPLE LAYER DIGITAL VIDEO

(75) Inventor: Hong Jiang, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 569 days.

(21) Appl. No.: 09/675,279

(22) Filed: Sep. 29, 2000

(51) Int. Cl.
G06K 9/36 (2006.01)
(52) U.S. Cl. .............. 382/239; 375/240.02; 348/388.1; 348/429.1
(58) Field of Classification Search ................ 382/239; 348/384.1, 388.1, 429.1; 375/240, 240.12, 375/240.02
See application file for complete search history.

(56) References Cited

U.S. PATENT DOCUMENTS

| | | | | |
|---|---|---|---|---|
| 5,995,150 A | * | 11/1999 | Hsieh et al. | 375/240.12 |
| 6,275,531 B1 | * | 8/2001 | Li | 375/240.12 |
| 6,496,980 B1 | * | 12/2002 | Tillman et al. | 725/90 |
| 6,510,553 B1 | * | 1/2003 | Hazra | 725/87 |
| 6,700,933 B1 | * | 3/2004 | Wu et al. | 375/240.16 |
| 2001/0004404 A1 | * | 6/2001 | Itokawa | 382/239 |

FOREIGN PATENT DOCUMENTS

| | | | |
|---|---|---|---|
| EP | 644695 A2 | * | 3/1995 |
| EP | 0 732 856 | | 9/1996 |
| WO | WO97/01934 | | 1/1997 |

OTHER PUBLICATIONS

M. Nomura et al. "Layered coding for ATM based video distribution systems." Signal Processing Image Communication 3(4): 1991, p. 301-311.
D. Taubman et al. "Highly scalable, low-delay video compression." Proceedings of 1st International Conference on Image Processing, Austin TX (1994), p. 740-744.
J. Li et al. "An embedded DCT approach to progressive image compression." Proceedings of 3rd IEEE International Conference on Image Processing, Lausanne, CH (1996), p. 201-204.

* cited by examiner

Primary Examiner—Andrew W. Johns
Assistant Examiner—Patrick Edwards
(74) Attorney, Agent, or Firm—Alan L. Pedersen-Giles

(57) ABSTRACT

In an encoding process, video data are represented as a bitstream of quantized base data and enhancement data, which capture the difference between a quantized base video picture and an original unquantized input video picture. Due to bandwidth constraints on a communication channel, it may be unfeasible to transmit all enhancement data. During the encoding process, the enhancement data may be divided into "layers" based upon bandwidth restrictions. Following transmission, the layers are recombined and are added to the base data by a decoder, producing a viewable video sequence.

15 Claims, 10 Drawing Sheets

Fig. 8A
(PRIOR ART)

| 120 | 89  | 32 | 54 | 68 | 66 | 66 | 19 |
|-----|-----|----|----|----|----|----|----|
| 100 | 105 | 60 | 22 | 32 | 40 | 13 | 6  |
| 101 | 75  | 53 | 33 | 12 | 35 | 18 | 5  |
| 95  | 70  | 50 | 44 | 25 | 28 | 17 | 3  |
| 92  | 50  | 45 | 34 | 28 | 11 | 10 | 4  |
| 82  | 48  | 47 | 24 | 19 | 3  | 3  | 4  |
| 71  | 32  | 23 | 21 | 17 | 7  | 0  | 2  |
| 30  | 35  | 27 | 18 | 7  | 2  | 1  | 0  |

← 190

| 1 | 1 | 0 | 0 | 1 | 1 | 1 | 0 |
|---|---|---|---|---|---|---|---|
| 1 | 1 | 0 | 0 | 0 | 0 | 0 | 0 |
| 1 | 1 | 0 | 0 | 0 | 0 | 0 | 0 |
| 1 | 1 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

← 192

| 1 | 0 | 1 | 1 | 0 | 0 | 0 | 0 |
|---|---|---|---|---|---|---|---|
| 1 | 1 | 1 | 0 | 1 | 1 | 0 | 0 |
| 1 | 0 | 1 | 0 | 1 | 1 | 0 | 0 |
| 0 | 0 | 1 | 1 | 0 | 0 | 0 | 0 |
| 0 | 1 | 1 | 1 | 0 | 0 | 0 | 0 |
| 0 | 1 | 1 | 0 | 0 | 0 | 0 | 0 |
| 0 | 1 | 0 | 0 | 0 | 0 | 0 | 0 |
| 0 | 1 | 0 | 0 | 0 | 0 | 0 | 0 |

← 194

| 1 | 1 | 0 | 1 | 0 | 0 | 0 | 1 |
|---|---|---|---|---|---|---|---|
| 0 | 0 | 1 | 1 | 0 | 0 | 0 | 0 |
| 0 | 0 | 1 | 0 | 0 | 0 | 1 | 0 |
| 1 | 0 | 1 | 0 | 1 | 1 | 1 | 0 |
| 1 | 1 | 0 | 0 | 1 | 0 | 0 | 0 |
| 1 | 1 | 0 | 1 | 1 | 0 | 0 | 0 |
| 0 | 0 | 1 | 1 | 1 | 0 | 0 | 0 |
| 1 | 0 | 1 | 1 | 0 | 0 | 0 | 0 |

BANDWIDTH DETERMINATION FOR MULTIPLE LAYER DIGITAL VIDEO

BACKGROUND

This invention relates to video processing.

For communication on a limited bandwidth digital channel, analog video is often encoded into a bitstream and the bitstream compressed. Decompression and conversion back to analog is done at the receiver end.

A compression technique that partially compensates for loss of quality involves separating the video data into two bodies of data prior to transmission: a "base" body of data and an "enhancement" body of data. The base data include a low-quality version of the video sequence, but can be transmitted using comparatively little bandwidth.

The enhancement data provide correction to the base data. Enhancement data may contain information to enhance the color of a region of a picture and to enhance the detail of the region of a picture. At the receiving end, the base data may be recombined with the enhancement data during the decoding process. Recombining the base data with all enhancement data will result in output video of quality very close to the original video. Because of communication channel bandwidth constraints, however, the full body of enhancement data often cannot be transmitted. Consequently enhancement data are divided into smaller subsets, each of which requires little bandwidth, and one or more subsets of enhancement data may be transmitted at the same time as the base data. Transmitting more enhancement data produces better output video, but requires more bandwidth.

BRIEF DESCRIPTION OF THE DRAWINGS

FIGS. 8a and 8b show an example body of magnitudes of enhancement data coefficients, divided into subsets of bit planes and layers.

DETAILED DESCRIPTION

Generally, the techniques described below improve the distribution of video data in a network in which different communication paths are characterized by different bandwidths.

Figure 1A:
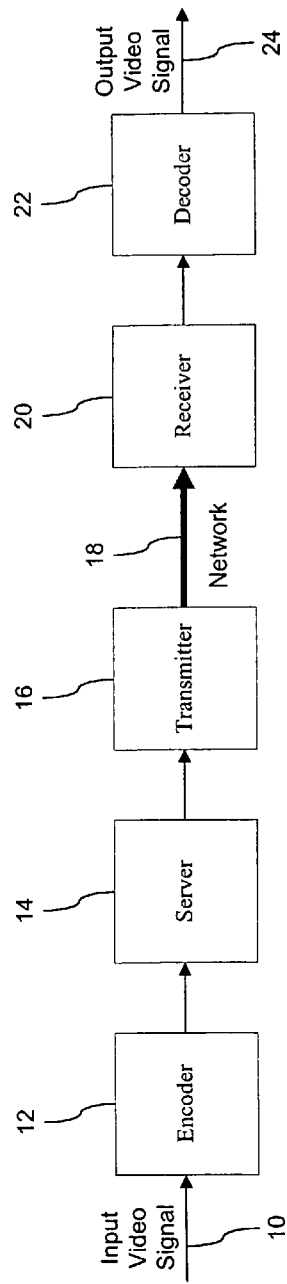
FIG. 1a is a functional block diagram showing a path of a video signal.

FIG. 1a is a block diagram showing a path taken by video data being distributed over a network. Input video signal 10 is fed into an encoder 12, which converts input video signal 10 into video data in the form of a machine-readable series of bits, or bitstream. The video data are then stored on a server 14, pending a request for the video data. When server 14 receives a request for the video data, it sends the data to a channel 16, which transmits the data 18 along a communication channel on the network, A receiver 20 receives the data 18 and sends the data as a bitstream to a decoder 22. Decoder 22 converts the received bitstream into an output video signal 24, which may then be viewed.

Figure 1B:
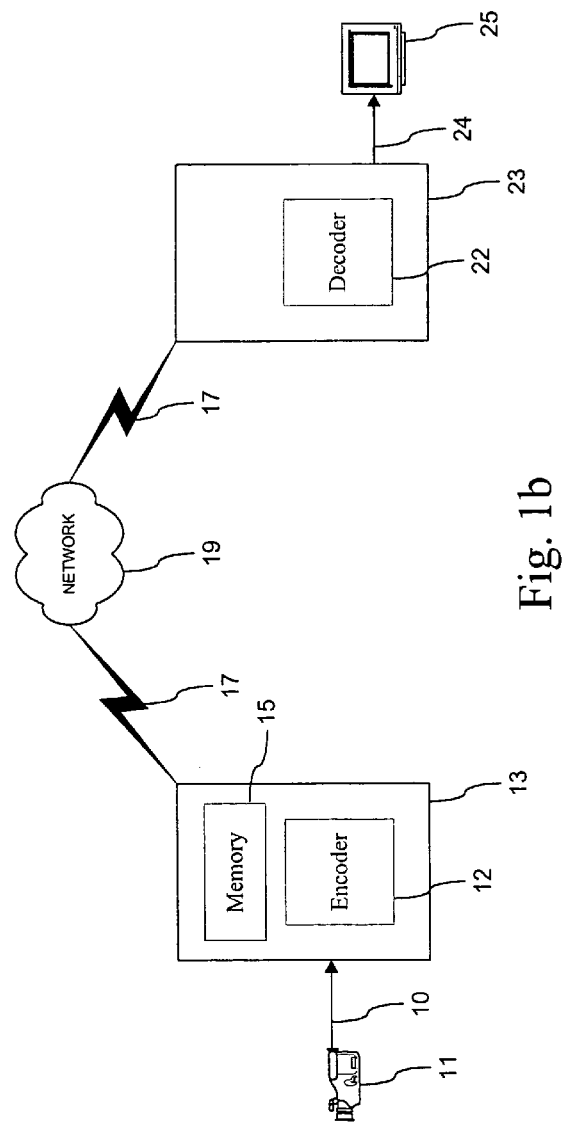
FIG. 1b is a diagram showing a path of a video signal.

FIG. 1b shows a system for distributing video data. A video source 11 produces input video signal 10, which is input to a first computer 13. First computer 13 includes encoder 12, which encodes the video data in a bitstream 18 for transmission along communication channel 17 coupled to network 19. First computer 13 also includes memory 15 to store the video data and may function as server 14. A second computer 23, which includes decoder 22, receives bitstream 18 via channel 21. Decoder 22 converts the received bitstream 18 into an output video signal 24, which may then be viewed on a viewer 25.

The encoding done in encoder 12 may involve lossy compression techniques such as MPEG-2 or MPEG-4, version 1 or version 2. (MPEG is short for Motion Picture Experts Group, and MPEG-2 and MPEG-4 represent digital video compression standards and file formats developed by the group.) These techniques result in the creation of a body of base video data, that is, a body of data sufficient to permit generation of a viewable video sequence of lesser quality than is represented by the source video sequence. If the base video data were to be decoded and viewed, the resulting video would be perceived as an inferior version of the original video.

One lossy compression technique employed by MPEG is to encode most of the pictures in the video sequence as changes from one picture to the next (along with motion vectors), rather than as the picture data itself. This technique results in a considerable saving of bandwidth.

Another body of data, called enhancement data, captures the difference between a quantized base video picture and an original unquantized input video picture. When combined with the base data, the enhancement data improve the quality of the viewable video sequence, resulting in improved video output.

A subset of enhancement data may include corrections to a picture, or corrections to the change from one picture to the next. In general, enhancement data correspond to the base data, i.e., if the base data encode the changes from one picture to the next, then the enhancement data corresponding to the base data includes a correction to the change from one picture to the next. Enhancement data may also be used during decoding 22 to reconstruct pictures that have been removed from the encoded base video data during encoding 12.

In many circumstances, the communication channel 16 has limited bandwidth, and can accommodate some, but not all, of the enhancement data. When receiver 20 and decoder 22 receive less than the full amount of enhancement data, output video 24 is less than fully corrected. The techniques described below utilize the bandwidth efficiently, delivering greater enhancement for a given bandwidth, by creating subsets or "layers" of enhancement data by a threshold-based process to be described below.

Figure 2:
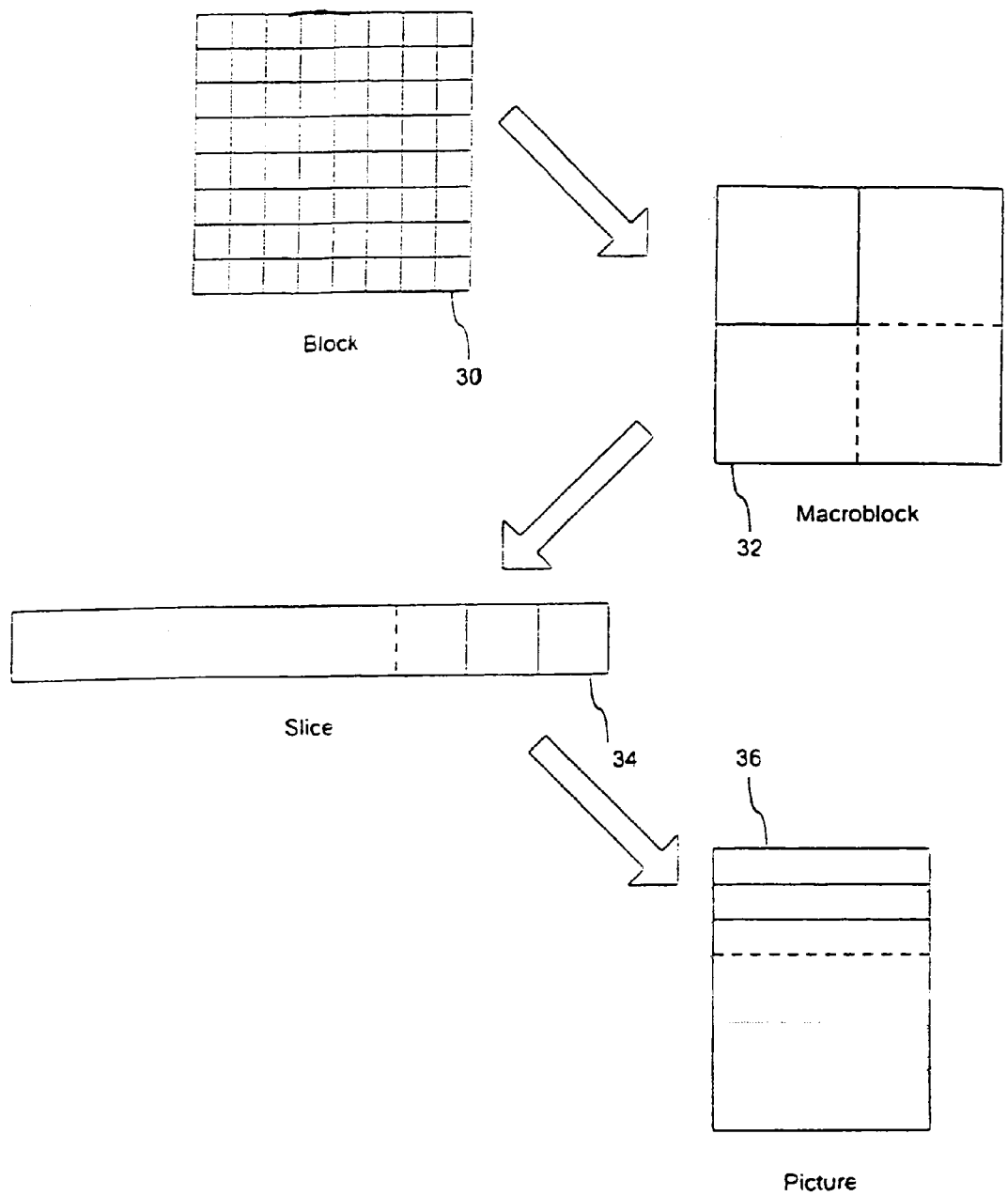
FIG. 2 is a hierarchical representation of units making up a typical picture.

FIG. 2 shows some units that form a picture. In general, a picture is made up of picture elements, or pixels. An 8-by-8 square of pixels forms a block 30, and a 2-by-2 square of blocks forms a macroblock 32. Macroblocks placed side-by-side may form a slice 34 of picture data. A slice is a horizontal strip of the picture or several adjacent strips in raster scanning order. A sequence of slices may compose a picture 36. For purposes of illustration, the process of encoding will be demonstrated by looking at an 8-by-8 block of video data 30. Actual processing may take place using units of data other than an 8-by-8 blocks, such as a macroblock 32.

During the encoding process, the picture data may undergo a transformation process as a part of data compression. A widely-used transform is the discrete cosine transform (DCT). The DCT is a linear transform similar to the discrete Fourier transform in that the transformed data are ordered by frequency and are weighted by coefficients. An 8-by-8 block of pixels undergoing a DCT will generate an 8-by-8 matrix of coefficients. The DCT may operate on groups of pixels of other sizes as well, such as a 16-by-16 block, but the transform of an 8-by-8 block is an exemplary application of the DCT. In general, the DCT treats each 8-by-8 block of pixels as a discrete signal. The DCT creates an 8-by-8 matrix of coefficients representing the horizontal frequency and the vertical frequency of the pixels.

Figure 3A:
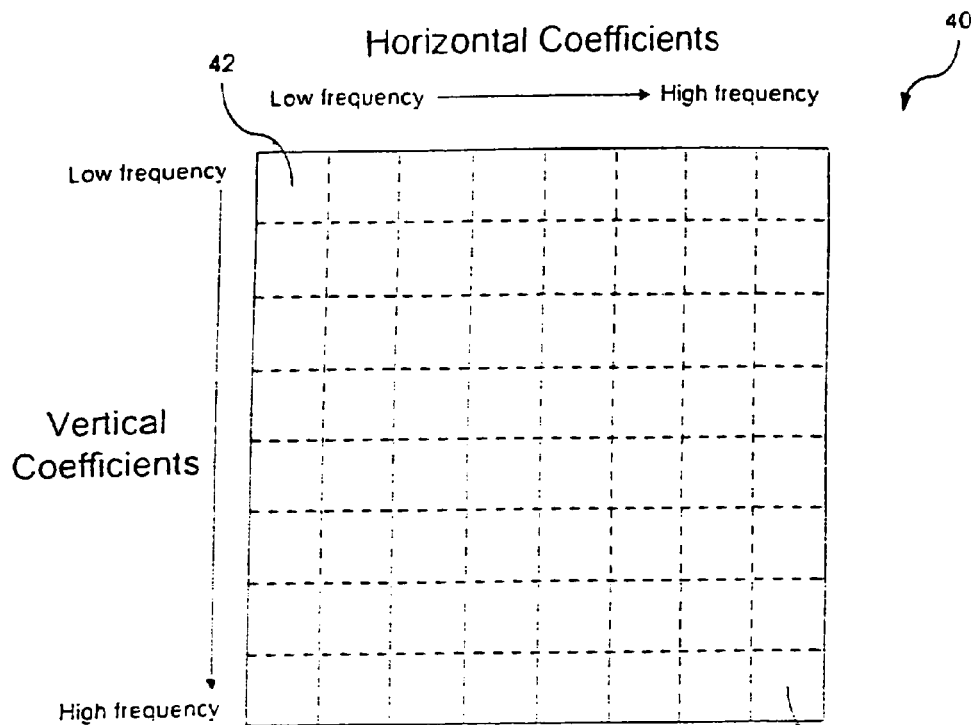
FIGS. 3a and 3b are diagrams depicting organization of DCT coefficients.

FIG. 3*a* illustrates how a DCT arranges the coefficients in an 8-by-8 matrix 40. The horizontal coefficients are ordered with the lower-frequency terms on the left and the higher-frequency terms on the right. The vertical coefficients are ordered with the lower-frequency terms on the top and the higher-frequency terms on the bottom. The coefficient stored in the uppermost leftmost cell 42 represents the portion of the 8-by-8 block of pixels that has zero horizontal frequency and zero vertical frequency, the portion that is constant throughout the block. This coefficient, which is often called the "DC coefficient," may represent the average color and brightness of the entire block of pixels. The coefficient stored in lowermost rightmost cell 44 represents the highest amount of horizontal and vertical change within the block.

The coefficients within matrix 40 can be integers of any arbitrary range. Frequently the coefficients are stored as a magnitude, consisting of a set of bits, and a sign (positive or negative), consisting of a single bit.

Figure 3B:
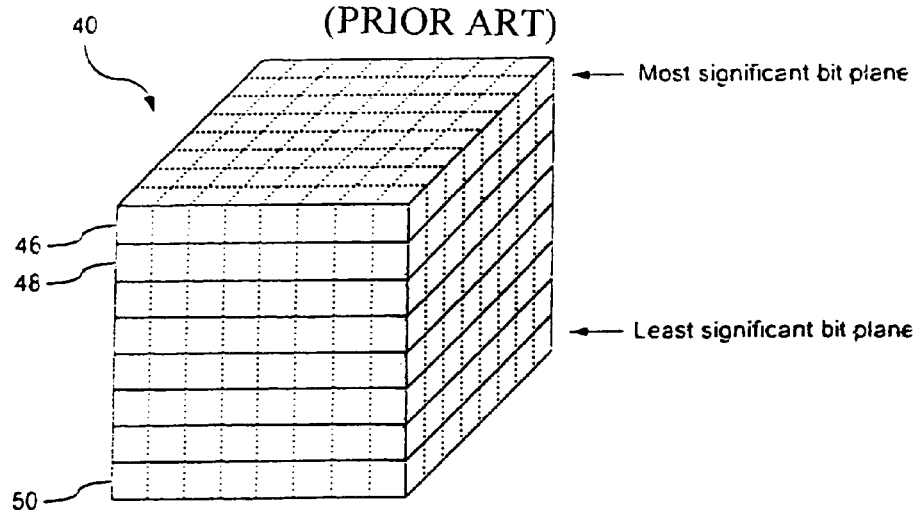

As illustrated in FIG. 3*b*, matrix 40 may be visualized as a three-dimensional array of binary coefficients, with each cell of the array occupied by a '1' bit or a '0' bit. The uppermost plane of bits, or "bit plane" 46, represents the most significant bits. The next highest plane 48 represents the next most significant bits, and so on. The lowermost plane 50 represents the least significant bits. The array shown in FIG. 3*b* represents an 8-by-8 matrix of coefficients, with each coefficient consisting of eight bits. Thus, each coefficient can represent an integer from 0 to 255 ($2^8-1$). More or fewer than eight bits can be used to represent the coefficients.

The encoding process generates a matrix of coefficients of enhancement data, which can be further divided into a plurality of bit planes for transmission. As will be discussed below, dividing the enhancement data into bit planes is inefficient and inflexible. A threshold-based layering process introduced below offers a more flexible and efficient way of dividing the enhancement data.

Figure 4:
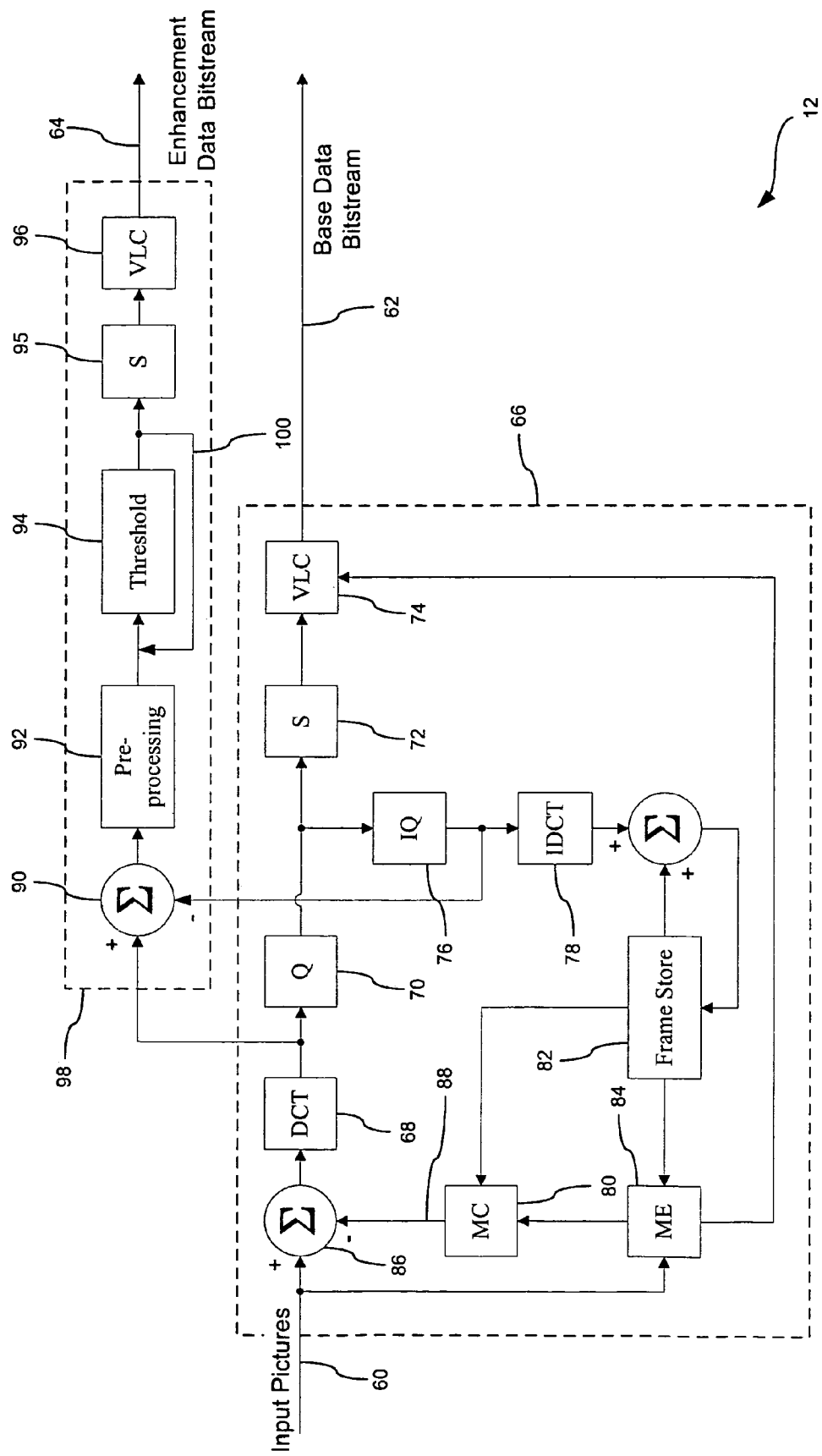
FIG. 4 is a block diagram showing video encoding and compression.

FIG. 4 shows a block diagram of an exemplary encoder 12. Encoder 12 may be implemented as software, which may be stored in a machine or computer system on any machine-readable medium such as a magnetic disk or optical drive, or may be stored within non-volatile memory such as read-only memory (ROM). FIG. 4 demonstrates encoding and compression of a series of input pictures 60, resulting in a base data bitstream of video data 62 plus a bitstream of enhancement data 64. Base data bitstream 62 and enhancement data bitstream 64 may be combined into a single output bitstream (not shown) by a multiplexer (not shown), prior to storage on a server or transmission along a communication channel.

The base data may be created by standard video encoding and compression 66. The encoding and compression components 66 shown in FIG. 4 are illustrative but are not the only way to achieve encoding and compression. Encoding and compression may employ a DCT 68, quantization 70, scanning 72 and variable length coding 74. Creation of base data 62 is a lossy process, with most of the loss occurring during quantization 70. FIG. 4 also includes components to encode the changes between individual pictures, including inverse quantization 76, an inverse discrete cosine transform (IDCT) 78, motion compensation 80, frame store 82, motion estimation 84, and subtraction 86 of an earlier picture 88 from input picture stream 60 to isolate the changes from one picture to the next.

FIG. 4 shows a subtraction 90 that results in the creation of enhancement data. The enhancement data undergo processing 98 separate from the base data. The enhancement data consist of the difference between the unquantized base video data and the unquantized input video. In FIG. 4, the enhancement data corresponding to each picture represent enhancements to the changes between individual pictures, as well as enhancements to the individual pictures themselves.

The enhancement data can undergo optional pre-processing 92. Pre-processing may include, for example, emphasizing the visually important components in the enhancement data and de-emphasizing the visually insignificant components. In general, people watching a video generally tend to focus upon the overall appearance of the pictures, rather than upon the details of the pictures. Information related to the overall appearance, which is more visually significant, tends to be concentrated in the lower-frequency DCT terms shown in FIG. 3. Information related to details of the picture, which is less visually significant, tends to be concentrated in the higher-frequency DCT terms. Pre-processing can be used to emphasize the visually significant data, giving it higher transmission priority.

The enhancement data undergo a threshold-based layering process 94, described in more detail below. Iterative application 100 of threshold-based layering process 94 creates multiple layers of enhancement data. The layers are scanned 95 and coded by a variable length coder 96, resulting in an enhancement data bitstream 64.

Base data bitstream 62 and enhancement data bitstream 64 may be stored on a server awaiting a client's request for the video sequence or broadcast to the network. When the video data are transmitted over communication channel 17, base data 62 are transmitted, typically with layers of enhancement data.

Figure 5:
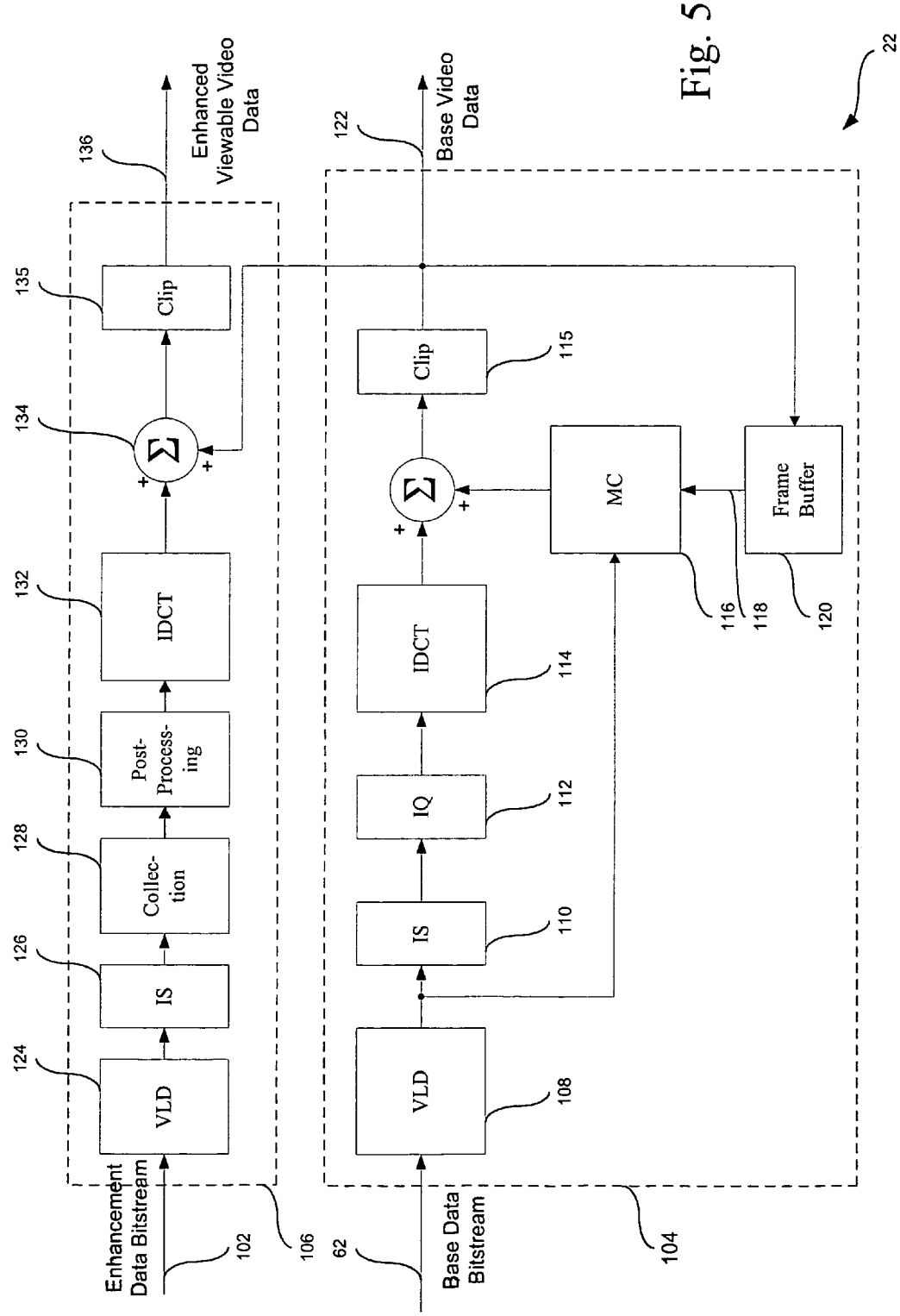
FIG. 5 is a block diagram showing video decoding.

FIG. 5 shows a block diagram of an exemplary decoder 22. Decoder 22, like encoder 12, may be implemented as software. FIG. 5 demonstrates a method for decoding and recovery of video data that has been transmitted by a server 14 over a communication channel 17 and received 20 by a client. Decoder 22 shown in FIG. 5 illustrates one way to decode the video data but not the only way to decode the data. Some of the operations depicted in FIG. 5 are linear, and may appear in a different order. For example, FIG. 5 depicts enhancement data as recombined with base data after IDCT operations 114, 132. With this technique, a base data value corresponds to a picture unit such as a pixel, and the enhancement data represent corrections to the picture unit. Because the discrete cosine transform is linear, however, enhancement data can be recombined with base data before IDCT operations 114, 132. In the latter case, the base data values represent DCT coefficients, and the enhancement data represent corrections to the coefficients. Furthermore, decoding may include additional operations that do not appear in FIG. 5.

The input to decoder 22 includes a bitstream of video data (not shown), which may be separated into a bitstream of base data 62 and a bitstream of enhancement data 102. A demultiplexer (not shown) may be used to separate the bitstreams. Base data bitstream 62 shown in FIG. 5 is the same as bitstream 62 shown in FIG. 4. Enhancement data bitstream 102 shown in FIG. 5, however, is not necessarily the same as enhancement data bitstream 64 shown in FIG. 4. Because of limitations in channel bandwidth, less than the full amount of enhancement data might be transmitted on the channel.

The base data and the enhancement data are subjected to different decoding processes, or "pipelines" 104, 106. Just as the encoding of base data and enhancement data may not have involved identical steps, there may be some differences in the decoding processes as well.

In base data decoding pipeline 104, the base data undergoes variable length decoding 108, an inverse scan 110, an inverse quantization 112, and an IDCT 114. Variable length decoding 108, inverse scan 110, inverse quantization 112 and IDCT 114 operations essentially undo variable length coding 74, scanning 72, quantization 70 and DCT 68 operations performed during encoding shown in FIG. 4. Decoded base data may then be processed in a motion compensator 116, which may reconstruct individual pictures based upon the changes from one picture to the next. Data from a previous, or "reference" picture 118 may be stored in a temporary memory unit called a "frame buffer" 120 and may be used as a reference. Decoded data from IDCT 114 is used by motion compensator 116 to determine how the next picture in the sequence changes from the previous picture. IDCT 114 may result in the creation of invalid video data, such as number out of range. A "clip" function 115 makes the data valid by setting the datum to the nearest in-range number. The output of the base data pipeline 104 is decoded base video data 122. The base data decoding techniques shown in FIG. 5 are illustrative but are not the only way to achieve decoding.

Decoding pipeline for enhancement data 106 is different from decoding pipeline for base data 104. The enhancement data undergo a variable length decoding process 124 and an inverse scan process 126, which undo variable length coding 96 and scanning 95 performed by encoder 12. The data then undergo collection 128 and post-processing 130. Collection 128, which will be described in more detail below, combines the layers of enhancement data produced by threshold-based layering process 94. Post-processing 130 undoes pre-processing 92 performed by encoder 12. The output from the IDCT 132 represents a correction, which is summed 134 with the base data and clipped 135, resulting in enhanced viewable video data 136.

As noted above, bandwidth constraints often prevent transmission of the full body of enhancement data. Where bandwidth constraints exist, it is desirable to transmit subsets of the enhancement data that produce the best output video quality. One way to select subsets of enhancement data is to transmit the enhancement data bit plane by bit plane. Server 14 transmits most significant bit plane 46 first, followed by the bit plane containing the next most significant bits 48. Server 14 continues to transmit as many bit planes as the bandwidth can accommodate. Most significant bit plane 46 receives the highest transmission priority, bit plane 48 with the next most significant bits receives the next highest transmission priority, and so on. Because of bandwidth limitations, bit planes containing less significant bits might not be transmitted at all.

Bit plane by bit plane transmission of enhancement data is inefficient for several reasons. First, most corrections to the base data tend to be relatively small corrections. As a result, most of the numbers in a block 40 of enhancement data tend to be small numbers, and therefore most significant bit plane 46 usually contains a high percentage of '0' bits. Similarly, next most significant bit plane 48 is likely to consist of a high percentage of '0' bits, although typically the percentage is not as high as in most significant bit plane 46. Transmitting only two bit planes of enhancement data, therefore, will generally result in an unsatisfying correction to the base data, because most of the enhancement bits are '0' bits. As a result, transmitting enhancement data bit plane by bit plane will not result in improved picture quality proportional to bandwidth. Cutting the available bandwidth by half, for example, will usually result in cutting the picture correction quality by more than half.

Second, each bit plane undergoing variable length coding 96 consumes unequal amounts of bandwidth. Typically most significant bit plane 46 needs the least bandwidth and least significant bit plane 50 needs the most bandwidth. Generally speaking, each bit plane consumes more bandwidth than the bit plane above it. If enhancement data are transmitted bit plane by bit plane, each transmitted bit plane will consume a larger amount of bandwidth than the bit plane previously transmitted. At some point the bandwidth cannot accommodate an entire new bit plane, so only part of a bit plane can be transmitted. As a result, only part of a picture 36 receives the enhancement of the bit plane, and the rest of the picture does not. The entire picture 36 is not enhanced equally.

Third, bit plane by bit plane transmission is inflexible and does not allow for adjustment due to the quality of the enhancement data.

The techniques described herein provide a more efficient use of available bandwidth by employing a threshold-based layering process 94. Threshold-based layering process 94 provides for improvement to the picture as a whole, by flexibly dividing the enhancement data into layers, rather than rigidly into bit planes. Partitioning the enhancement-data into bit planes takes no account of the characteristics of the enhancement data. Dividing the enhancement data into layers, by contrast, allows the enhancement data to be partitioned depending upon the characteristics of the enhancement data. Threshold-based layering process 94 thus permits encoder 12 to adjust the encoding process to the enhancement data. An advantage of threshold-based layering is that it can usually produce a plurality of layers consuming approximately equal amounts of bandwidth, thereby more closely relating the quality of the received picture to the available bandwidth.

Figure 6:
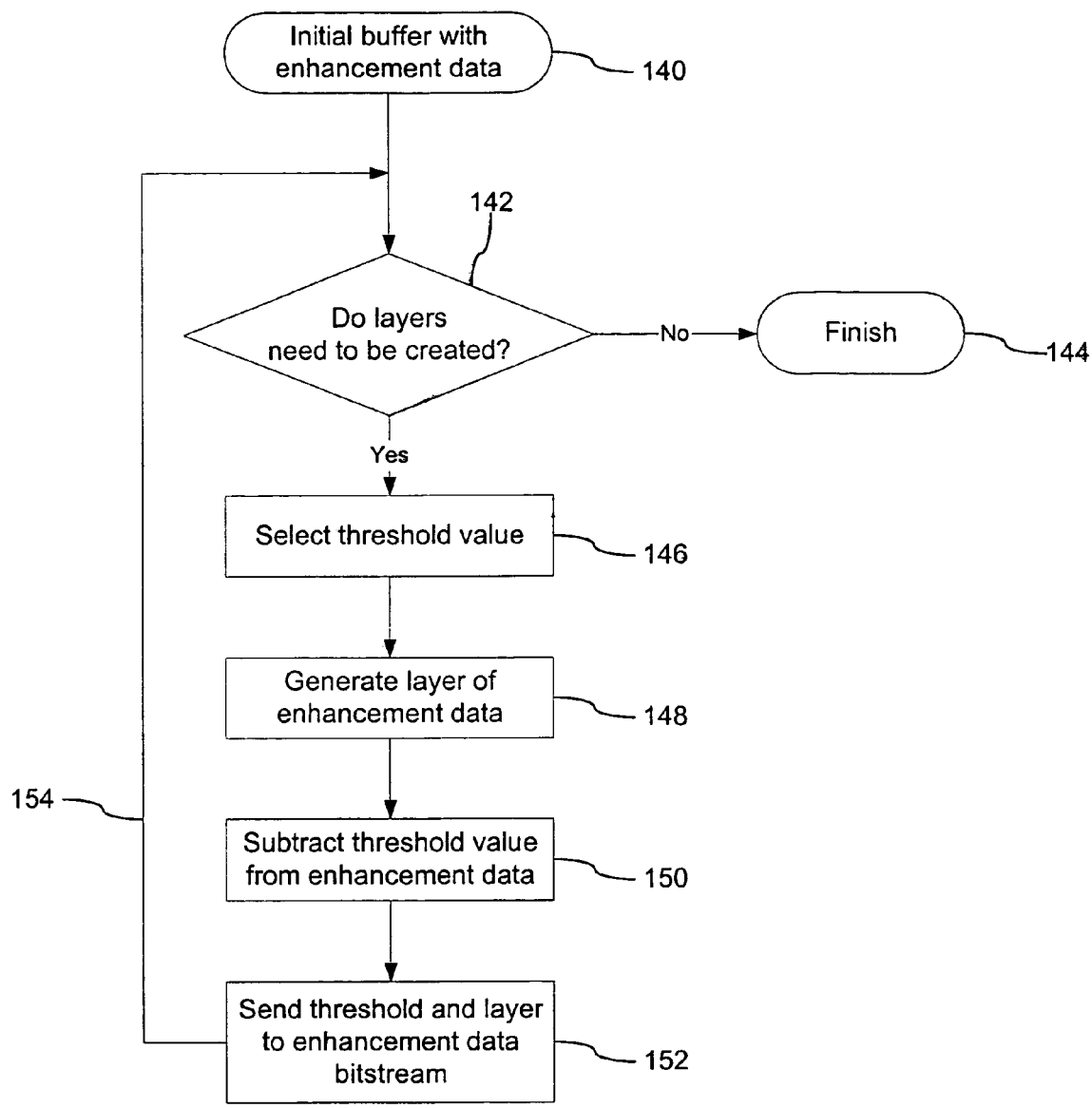
FIG. 6 is a flowchart illustrating a threshold-based layering process.

The process of creation of enhancement layers is depicted in FIG. 6. The process begins with a body of enhancement data (140) entering threshold-based layering process 94. A determination is made whether layers of enhancement data need to be created (142) and if not, threshold-based layering process 94 is concluded (144). There are many conditions that could terminate the layering process. For example, if the enhancement data consist entirely of '0' bits, then there are no more data to be processed, and the layering process 94 terminates. Other terminating conditions can be whether process 94 has produced a predetermined number of layers, or whether all available bandwidth has been exhausted. Encoder 12 may also be allowed to determine the number of layers to be generated.

As will be explained in more detail below, creating a layer of enhancement data includes selecting a threshold value (146). On the basis of this threshold value, a layer of enhancement data (148) consisting of '1' bits and '0' bits is generated. The layer of enhancement data includes a '1' bit for all magnitudes greater than or equal to the threshold value, and a '0' bit for all magnitudes less than the threshold value. By selection of the threshold value, a layer may contain more, fewer, or an equal number of '1' bits than would be contained in a bit plane. The threshold can be selected to regulate the number of '1' bits in a layer, or to regulate the distribution of '1' bits within a layer, or to control the bandwidth consumed by a layer, or any combination thereof. The threshold value is subtracted from the magnitude of the enhancement data (150), but only from those magnitudes equal to or in excess of the threshold so that no negative magnitudes are created.

Once the layer is created, the layer may be included (152) in the enhancement data bitstream 64. The layer typically includes a header that stores the value of the chosen threshold. The threshold value in the header can be used by decoder 22 to decode the enhancement data. In addition to the threshold value and the layer of data, the sign values may be sent as well. Although there are many ways to transmit sign value data, generally speaking it is more efficient to transmit sign values only for coefficients actually included in the enhanced data bitstream, and to transmit a coefficient's sign value only once. The layering process may then be repeated (154) to create additional layers with different threshold values. It is possible that the same threshold value may be used repeatedly to create layers, and it is also possible that a later threshold value may have a higher value than an earlier threshold value.

Figure 7:
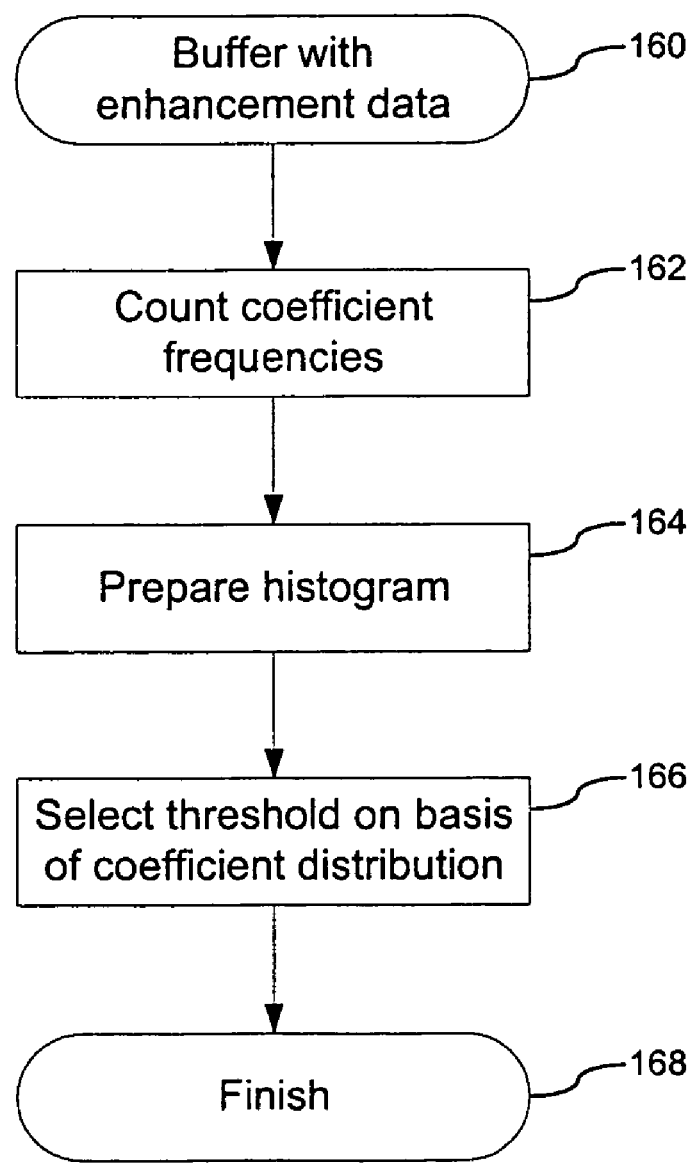
FIG. 7 is a flowchart illustrating selection of a threshold.

There are many ways to select a threshold level based upon the characteristics of the enhancement data. One of the ways to set a threshold level is shown in FIG. 7. The enhancement data (160) are evaluated by counting the frequencies of the coefficient magnitudes (162). A statistical analysis, such as the preparation of a histogram (164), is used to evaluate the distribution of the coefficients. Based upon the distribution shown by the statistical analysis (164), a threshold is selected to divide the enhancement data into layers (166). Ways to partition the enhancement data include selecting a target number of '1' bits for the enhancement layer, creating a layer to fit within a desired bandwidth, creating a layer to produce a desired enhancement quality, creating a layer depending upon other characteristics of the enhancement data, or any combination thereof. A technique illustrated below involves selection of threshold values to produce a plurality of layers, each layer containing approximately a target number of '1' bits.

Figure 8B:
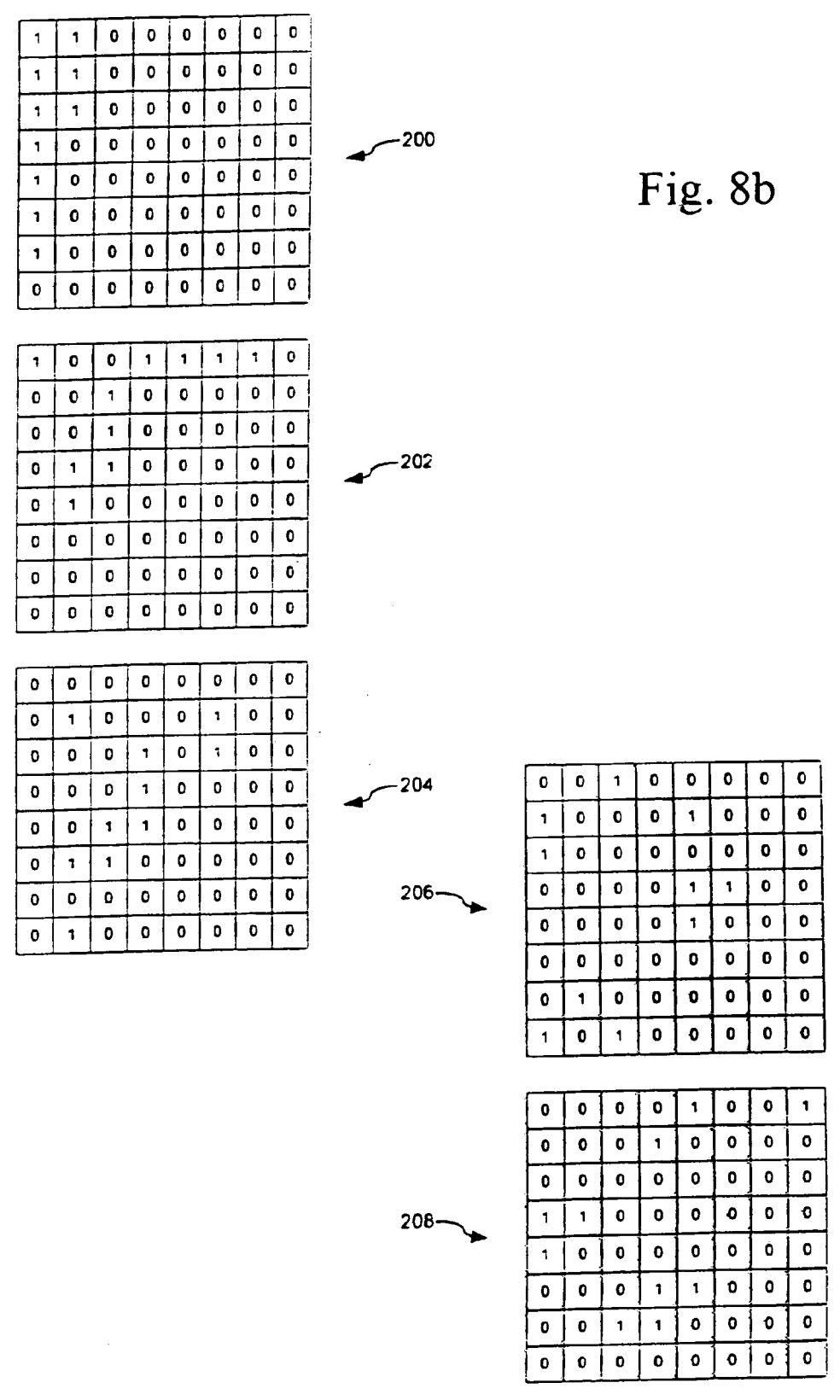

FIGS. 8A and 8B use an exemplary block of coefficient magnitudes (190) for a small picture to compare generation of five layers of enhancement data (200, 202, 204, 206, 208) to generation of three bit planes (192, 194, 196). FIGS. 8A and 8B also illustrate one of many techniques for selection of threshold values. Beginning with an exemplary block of coefficient magnitudes (190), it can be determined that the largest value in the block is 120 (which is, in this example, the magnitude of the DC coefficient), or the seven-bit binary number '1111000'. Because the largest value in the block (190) can be expressed with seven bits, the block as a whole can be expressed in seven bit planes. The most significant bit plane (192) includes fourteen '1' bits. The second most significant bit plane (194) includes twenty-one '1' bits. The third most significant bit plane (196) includes twenty-six '1' bits, almost twice as many as the most significant bit plane (192). Because the number of '1' bits increases with each successive bit plane, each bit plane consumes more bandwidth than the bit plane before it.

In contrast to the three bit planes (192, 194, 196) in FIG. 8A, FIG. 8B shows five layers of enhancement data (200, 202, 204, 206, 208), each layer targeted to include approximately ten '1' bits. The first enhancement layer (200) was created by the selection of a first threshold value of 71. The resulting first layer of enhancement data (200) includes a '1' bit for all coefficient magnitudes greater than or equal to the first threshold value of 71, and a '0' bit for all magnitudes less than the threshold value. Selection of a first threshold value of 71 results in first layer (200) which includes ten '1' bits.

The first threshold value of 71 is then subtracted from all of the magnitudes that are greater than or equal to the threshold value (150) and a second layer (202) can be generated. The second selected threshold value is 49, which results in a second layer of enhancement data (202). Like the first layer, the second layer includes ten '1' bits.

The process then repeats to create the third layer (204), which uses a third threshold value of 33. Once again, the third layer (204) includes ten '1' bits. A fourth layer (206) created with a fourth threshold of 25 likewise includes ten '1' bits, as does a fifth layer (208) created with a fifth threshold of 19.

Thus, by selection threshold values, five layers of enhancement data (200, 202, 204, 206, 208) can be generated, each having ten '1' bits, and each layer consuming approximately the same bandwidth. In practice not all layers are likely to have exactly the target number of '1' bits, but by selection of threshold values based upon the distribution of the data, it is frequently possible to generate several layers that are close to each other in the number of '1' bits per layer. Moreover, although partitioning the enhancement data into layers of equal bandwidth may be desirable, the layers may also be of unequal bandwidth.

The available bandwidth may also play a role in determining the threshold values. If, for example, the total available bandwidth would accommodate about fifty '1' bits per unit of time, then using thresholds to divide the enhancement data into layers has advantages over dividing the enhancement data into bit planes. The threshold-based layering process includes the flexibility to generate five complete layers of enhancement data (200, 202, 204, 206, 208), each layer improving the entire picture and all layers capable of being carried within the available bandwidth. That same bandwidth could not, however, accommodate the first three bit planes (192, 194, 196), which include more '1' bits per unit time that the available bandwidth can accommodate. If the total available bandwidth would accommodate a different number of '1' bits, thresholds could be selected to produce layers capable of being carried within that bandwidth.

Threshold selection may also take into account whether the enhancement data are to be transmitted over two channels of differing bandwidth. If, for example, a first channel would accommodate about fifty '1' bits per unit of time, and a second channel would accommodate about thirty '1' bits per unit of time, then five complete layers (200, 202, 204, 206, 208) could be transmitted over the first channel and three complete layers (200, 202, 204) could be transmitted over the second channel.

Threshold selection may also be based upon other factors other than or in addition to bandwidth, such as the desired amount of improvement per layer.

Figure 9:
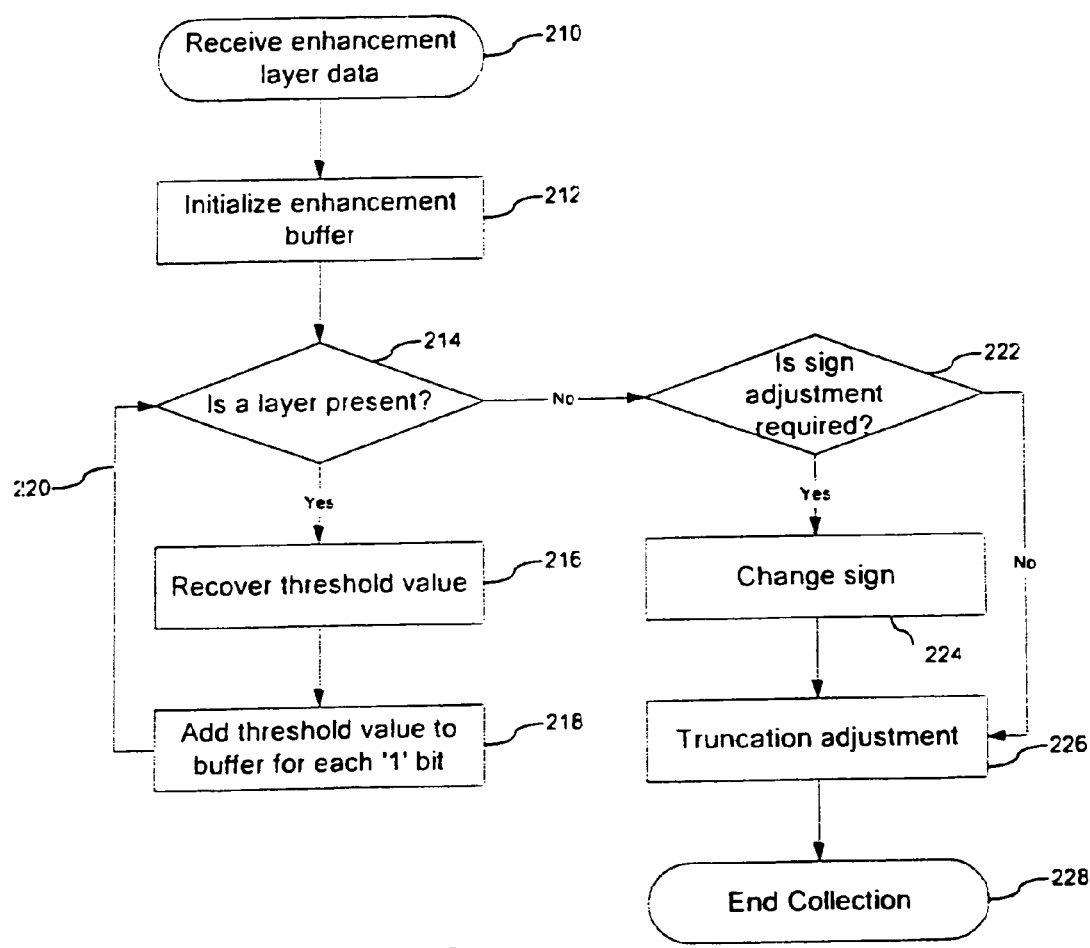
FIG. 9 is a flowchart illustrating collection of layers of enhancement data by a decoder.

After the layers and their corresponding threshold values are received by decoder 22, decoder 22 undoes the layering process by collecting 128 the layers. A process for collecting is illustrated in FIG. 9. At the beginning of the collection process, enhancement data for a particular unit of video data, such as a block 30, is received (210). The enhancement data typically consist of a plurality of layers. The layers of enhancement data are collected and may be held in a buffer, which will hold the magnitudes of the correction coefficients. Typically the correction coefficients in the buffer are initialized to zero (212). If a layer of enhancement data is present (214), the threshold value used to generate that layer is recovered, for example, the threshold is retrieved from the layer header (216). The threshold value is then added to each correction coefficient in the buffer for each '1' bit in the layer (218). For each '0' bit, nothing is added to the corresponding correction coefficient in the buffer. The process repeats (220) as long as there are additional layers. With each additional layer, the data in the buffer approaches the value of the data that underwent the threshold process 94 in encoder 12. When all layers have been collected, and the data in the buffer represent the collected enhancement data 102 received by decoder 22, which is usually only an approximation of the full body of enhancement data. The data are assigned the appropriate sign value (222, 224).

The data may also undergo an optional truncation adjustment (226). Truncation inaccuracies occur for non-zero magnitudes that fall below the lowest threshold value and are too small to be transmitted. These magnitudes are represented in the buffer as zeroes. Truncation adjustment adds a small amount of "noise" to replace the zeros. The noise may simply consist of adding a constant value, such as a number approximately one-quarter of the lowest threshold value, to all zeros in the buffer. Another option is to replace the zero values with random integer values smaller than the lowest threshold value. Following truncation adjustment (226), the collection process is then concluded (228) and the enhancement data may be further processed and combined with base data as shown in FIG. 5.

Various embodiments of the invention have been described. These and other embodiments are within the scope of the following claims.

What is claimed is:

1. A method comprising:
    determining an amount of available bandwidth;
    specifying a single bandwidth for each of multiple layers of digital video based on the amount of available bandwidth;
    selecting threshold values based upon the amount of available bandwidth for each of the multiple layers; and
    forming multiple layers of digital video enhancement data based on magnitudes of data coefficients in digital video greater than the selected threshold for each multiple layer, each of the multiple layers consuming substantially the specified bandwidth.

2. The method of claim 1 further comprising:
    transmitting the layer of video enhancement data over a digital communication channel; and
    transmitting the threshold value over the digital communication channel.

3. A method as in claim 1, wherein said forming comprises forming multiple layers which have digital ones and digital zeros, and wherein each of said multiple layers include substantially the same number of digital ones.

4. An article comprising a computer-readable medium which stores computer-executable instructions for video data processing, the instructions causing a machine to:
    determine an amount of available bandwidth;
    specify a single bandwidth for each of multiple layers of digital video based on the amount of available bandwidth;
    select threshold values based upon the amount of available bandwidth for each of the multiple layers;
    form multiple layers of digital video enhancement data based on magnitudes of data coefficients in digital video greater than the selected threshold for each multiple layer, each of the multiple layers consuming substantially the specified bandwidth.

5. The article of claim 4, the instructions further causing the machine to:
    transmit the layer of video enhancement data over a digital communication channel; and
    transmit the threshold value over the digital communication channel.

6. An article as in claim 4, wherein said instructions to form comprise forming multiple layers which have digital ones and digital zeros, and wherein each of the layers has a substantially similar number of digital ones.

7. An apparatus comprising:
    means for determining an amount of available bandwidth;
    means for specifying a single bandwidth for each of multiple layers of digital video based on the amount of available bandwidth;
    means for selecting threshold values based upon the amount of available bandwidth for each of the multiple layers; and
    means for forming multiple layers of digital video enhancement data based on magnitudes of data coefficients in digital video greater than the selected threshold for each multiple layer, each of the multiple layers consuming substantially the specified bandwidth.

8. The apparatus of claim 7, further comprising:
    means for transmitting the layer of video enhancement data over a digital communication channel; and
    means for transmitting the threshold value over the digital communication channel.

9. The apparatus of claim 8, wherein said means for said forming comprises forms multiple layers which have digital ones and digital zeros, and wherein each of said multiple layers include substantially the same number of digital ones.

10. A method comprising;
    generating from a source video sequence a digital base video signal;
    generating from the source video sequence a body of digital video enhancement data; and
    generating from the body of digital video enhancement data plural layers of digital video enhancement data by;
        specifying a single substantially equal bandwidth for each of the plural layers based on an amount of available bandwidth;
        selecting threshold values based upon the amount of available bandwidth for each of the plural layers; and
        forming plural layers of digital video enhancement data based on magnitudes of data coefficients in the body of digital video enhancement data greater than the selected threshold for each plural layer.

11. The method of claim 10, wherein the body of digital video enhancement data includes a plurality of magnitudes, and wherein forming plural layers of digital video enhancement data based on magnitudes of data coefficients in the body of digital video enhancement data greater than the selected threshold for each plural layer comprises:

forming plural layers of digital video enhancement data comprising a '1' bit for each magnitude greater than or equal to the threshold value.

12. An article comprising a computer-readable medium which stores computer-executable instructions for video data processing, the instructions causing a machine to:

generate from a source video sequence a digital base video signal;

generate from the source video sequence a body of digital video enhancement data; and generate from the body of digital video enhancement data plural layers of digital video enhancement data by:

specifying a single substantially equal bandwidth for each of the plural layers based on an amount of available bandwidth;

selecting threshold values based upon the amount of available bandwidth for each of the plural layers; and forming plural layers of digital video enhancement data based on magnitudes of data coefficients in the body of digital video enhancement data greater than the selected threshold for each plural layer.

13. The method of claim 12, wherein the body of digital video enhancement data includes a plurality of magnitudes, and wherein forming plural layers of digital video enhancement data based on magnitudes of data coefficients in the body of digital video enhancement data greater than the selected threshold for each plural layer comprises:

forming plural layer of digital video enhancement data comprising a '1' bit for each magnitude greater than or equal to the threshold value.

14. An apparatus comprising:

means for generating from a source video sequence a digital base video signal;

means for generating from the source video sequence a body of digital video enhancement data; and means for generating from the body of digital video enhancement data plural layers of digital video enhancement data comprising:

means for specifying a single substantially equal bandwidth for each of the plural layers based on an amount of available bandwidth;

means for selecting threshold values based upon the amount of available bandwidth for each of the plural layers; and means for forming plural layers of digital video enhancement data based on magnitudes of data coefficients in the body of digital video enhancement data greater than the selected threshold for each plural layer.

15. The apparatus of claim 14, wherein the body of digital video enhancement data includes a plurality of magnitudes, and wherein the means for forming plural layers of digital video enhancement data based on magnitudes of data coefficients in the body of digital video enhancement data greater than the selected threshold for each plural layer comprises: means for forming plural layers of digital video enhancement data comprising a '1' bit for each magnitude greater than or equal to the threshold value.

* * * * *